United States Patent [19]
Chen et al.

[11] Patent Number: 5,793,976
[45] Date of Patent: Aug. 11, 1998

[54] METHOD AND APPARATUS FOR PERFORMANCE MONITORING IN ELECTRONIC COMMUNICATIONS NETWORKS

[75] Inventors: Thomas M. Chen, Arlington; Stephen S. Liu, Acton, both of Mass.

[73] Assignee: GTE Laboratories Incorporated, Waltham, Mass.

[21] Appl. No.: 625,102

[22] Filed: Apr. 1, 1996

[51] Int. Cl.$^6$ .................................................. H04B 17/00
[52] U.S. Cl. .............. 395/200.54; 364/550; 364/551.01; 370/351
[58] Field of Search ............... 364/550, 551.01; 395/200.11, 200.01, 200.54; 370/351, 352, 353, 355, 389, 458

[56] References Cited

U.S. PATENT DOCUMENTS

| | | | |
|---|---|---|---|
| 5,251,204 | 10/1993 | Izawa et al. | 370/15 |
| 5,313,453 | 5/1994 | Uchida et al. | 370/13 |
| 5,343,463 | 8/1994 | van Tetering et al. | 370/253 |
| 5,381,408 | 1/1995 | Brent et al. | 370/517 |
| 5,428,616 | 6/1995 | Field et al. | 370/253 |
| 5,450,394 | 9/1995 | Gruber et al. | 370/17 |
| 5,457,700 | 10/1995 | Merchant | 371/27 |
| 5,504,754 | 4/1996 | Grünenfelder | 371/20.1 |

FOREIGN PATENT DOCUMENTS

| | | | |
|---|---|---|---|
| 2097350 | 2/1994 | Canada | H04L 1/24 |
| 0 583 920 A1 | 2/1994 | European Pat. Off. | H04L 12/26 |
| 0 619 661 A1 | 10/1994 | European Pat. Off. | H04L 12/26 |
| 6-224904 | 8/1994 | Japan | H04L 12/26 |

OTHER PUBLICATIONS

Chen, T., and Liu, S., "Management and Control Functions in ATM Switching Systems", IEEE *Network* vol. 8: 27–40 (Jul.–Aug., 1994).

Mandeville, Robert, "The ATM Stress Test: Which Switches Survived?", *European Network Laboratories*, pp. 1–15 (1995).

*Primary Examiner*—Emanuel Todd Voeltz
*Assistant Examiner*—Thomas Peeso
*Attorney, Agent, or Firm*—Leonard C. Suchyta

[57] ABSTRACT

Management packets are defined that are modified in the payload by each node along a virtual connection and are used to measure both end-to-end QoS and specific individual intermediate node performance parameters. Management packets are implemented by defining entirely new packets or by modifying ATM OAM cells. Switches or routers for use as intermediate nodes are defined that modify the payload of the management packet and locally measure packet delay and packet loss. An intermediate node measures and records the difference between the arrival and departure times of management packets at that switch utilizing delay-stamp fields within the management packets and either the switch internal routing header or timestamp fields within the packet. At the endpoint of the virtual connection, delay-stamp fields in the management packet indicate individual node delays and the cumulative delay. An intermediate node counts the number of packets it discards and records these values in the payload of the management packet individually and cumulatively.

19 Claims, 7 Drawing Sheets

METHOD AND APPARATUS FOR PERFORMANCE MONITORING IN ELECTRONIC COMMUNICATIONS NETWORKS

FIELD OF THE INVENTION

The present invention relates to electronic communications networks and, in particular, to performance monitoring of packet-switched data networks.

BACKGROUND

The Broadband Integrated Services Digital Network (B-ISDN) can accommodate a variety of packet-oriented protocols, including asynchronous transfer mode (ATM), in which standardized 53-byte data packets are utilized [ITU-T Rec. I.121, Broadband Aspects of ISDN, Melbourne, November 1988]. ATM and some other packet-oriented protocols are connection-oriented, utilizing what are known in ATM as virtual path connections (VPC) and virtual channel connections (VCC) that stretch between two endpoints across transmission links connected by intermediate nodes. These intermediate nodes are devices that forward and direct the packets to their intended destination endpoint, i.e. routers, or switches. Packet-switched data networks are capable of supporting a simultaneous mix of voice, video, and data services over either constant bit rate (CBR) or variable bit rate (VBR) connections.

For each virtual connection, an ATM network can guarantee to the customer a particular level of performance, known as a quality of service (QoS), that is negotiated between the user and the network during connection set-up. Once agreed upon, the QoS can only be changed through renegotiation between the two parties. In general, the delay experienced by a data packet as it travels along a network connection is an important measure of performance for a packet-switched network. QoS in ATM is specified mainly in terms of acceptable cell delay and acceptable cell loss rate [ATM Forum, ATM User-Network Interface Specification Version 3.0, Sep. 10, 1992]. ATM supports multiple QoS classes geared to differing application requirements for delay and loss performance. A VCC or VPC is therefore characterized by its requested QoS and throughput parameters. A VPC may carry statistically multiplexed VCCs of differing QoS classes, but the overall QoS of the VPC must satisfy the most demanding QoS of the carried VCCs. Specified QoS parameter values may be either explicitly requested by the user or implicitly associated with a particular service.

An important concern is management of traffic to ensure that users receive their guaranteed QoS. The assurance of a particular QoS is a fundamental part of the contractual agreement between the network and the users because certain applications critically depend on receiving a particular QoS from the network. Voice transmissions, for example, are particularly sensitive to end-to-end delay. For this reason, public telephone networks have a maximum allowable delay specification of 600 ms [Chen, Thomas M., Walrand, Jean, and Messerschmitt, David G., "Dynamic Priority Protocols for Packet Voice," *IEEE Journal on Selected Areas in Communications*, Vol. 7, No. 5, June 1989, pp. 632–643], with any delay greater than 15 ms generally requiring the use of echo cancellation [McDysan, David E. and Spohn, Darren L., *ATM: Theory and Application*, McGraw-Hill, 1995, p. 355].

Performance management, as a function of network management, has the simultaneous responsibilities of maintaining both the QoS per virtual connection and the efficient utilization of the network. Performance management itself depends largely on the data obtained through performance monitoring, which is conducted through measurement of the QoS per VPC/VCC. Because of the use of statistical multiplexing in ATM networks, the QoS of a virtual connection may in particular be adversely affected by the random flow of traffic on the network. QoS is also degraded by a number of other factors, including network congestion and transmission faults, as well as intermittent error conditions that may cause a gradual deterioration in QoS. Network providers need to be able to detect and diagnose troubles quickly in order to minimize the effect of those troubles on network users.

Performance monitoring can be done either through out-of-service testing or in-service QoS monitoring. Out-of-service testing involves performance measurements made under controlled traffic conditions. This type of testing has a number of drawbacks, not the least of which is that service on the network must be interrupted. In addition, the results received are only as accurate as the model used to create the controlled traffic conditions. It is entirely possible that the controlled conditions tested may not correctly model some of the conditions actually seen by the network during service. In addition, this method does not allow rapid detection of any subsequent degradation of the network.

In-service QoS monitoring involves continuous performance measurements on actual user traffic. No service interruption occurs and network degradation is instantaneously detected. Continuous performance monitoring is particularly important in high-speed networks where service deterioration may quickly affect a large amount of user data. In-service QoS measurements are also useful to supplement traffic control algorithms based on assumed traffic models, such as those used in out-of-service testing, that may not accurately characterize the actual traffic.

Current ATM standards provide for the measurement of cell delays and cell loss using Operations and Maintenance (OAM) cells [ITU-T Rec. I.610, B-ISDN Operations and Maintenance Principles and Functions, Geneva, June 1992; Bellcore, Generic Requirements for Operations of Broadband Switching Systems, TA-NWT-001248, issue 2 Oct., 1993]. OAM cells are specialized versions of standard 53-byte ATM cells, having a normal 5-byte header with a 48-byte information field, but carrying management information within the function-specific information fields instead of user data. ATM user cells themselves cannot be used for QoS monitoring because the payload is full of user data and no header fields are available to receive the information that is needed by the performance monitoring system for calculation and storage of cell loss and cell delay.

OAM cells are routed by the ATM network in the same manner as user cells, but are distinguished from user cells by the network by the assignment of special values to the VCI and/or PT fields in the 5-byte cell header, utilizing VCI=3, VCI=4, PT=4 or PT=5. OAM cells for performance management are further identified in the information field by a 4-bit OAM Cell Type=0010. A 4-bit OAM Function Type field in the information field further indicates the specific performance management function performed by the OAM cell, such as forward monitoring (0000), backward reporting (0001), or both (0010). A 10-bit EDC field contains an error detection code that is computed over the information field of the cell.

The forward monitoring procedure consists of inserting OAM performance management cells into the cell stream between blocks of user cells at one endpoint of the virtual connection. Backward reporting involves putting observed performance data into an OAM cell at a virtual connection endpoint and then sending the OAM cell backwards in the cell stream direction from which it came, in order to report the performance of that particular virtual connection to the originating endpoint.

To measure cell loss, the OAM cell contains the number of user cells sent in the preceding block (Total User Cell Number) in a 2-byte function-specific field. The destination endpoint of the virtual path counts the number of user cells received between the arrival of the previous OAM cell and the current OAM cell. If fewer cells are received at the destination than are indicated in the current OAM cell, the difference is interpreted to be the number of lost cells.

The major disadvantage of the current network performance monitoring method for measuring cell loss is that it cannot be assured of actually determining the exact number of cells lost. This is because cells can also be misinserted into the cell stream. Therefore, for example, if the OAM cell indicates that N user cells were sent and then N-1 cells are actually received, it is not possible to be sure whether 1 cell was lost, or whether 2 cells were lost and 1 misinserted, and so on. It is also not possible, using this method, to determine from where along the virtual connection, or from where within a cell block, the cell loss actually occurred.

In order to measure cell delay, the OAM performance management cell contains an optional 4-byte Timestamp field that is used to indicate the time that the OAM cell was inserted into the user stream. The timestamp is then compared with the arrival time of the cell at the virtual connection endpoint and the difference is inferred to be the end-to-end delay experienced by a cell along the virtual connection. However, this type of timestamp is meaningful at the destination only if the clocks at the two endpoints of the virtual connection are synchronized to the same time-of-day, something which is generally not practical.

In addition, the existing method of delay measurement does not take into account the fact that end-to-end delay actually consists of two distinct types of delay: fixed propagation delay, which is that delay introduced into the connection at a predictable level by the transmission links extending between the network nodes, and random delay. Random delay is that delay which is introduced by each of the intermediate nodes themselves, and can vary widely with network traffic levels and switch buffer capacity. In general, this type of delay is primarily due to queuing delays, which tend to increase with increased traffic load. The existing method of performance monitoring using OAM cells is not able to track the delay that is actually experienced at each node along the virtual connection due to such factors.

An alternative way to measure cell delay is to measure round-trip cell delay via an OAM loopback cell, which is identified by OAM Cell Type=0001 and OAM Function Type=1000. The loopback cell is sent along the virtual connection and then returned to its originating endpoint from the destination endpoint or from a prespecified intermediate node. A timestamp allows computation of the round-trip delay back at the originating endpoint, without the need for time-of-day clock synchronization between nodes. The one-way end-to-end delay is then estimated as half the round-trip delay. However, while the loopback cell method can measure the round-trip delays without need for clock synchronization, it gives only an estimate of the one-way cell delay. This estimate may in actuality be very inaccurate if the network congestion or characteristics have altered greatly between the two halves of the OAM cell's trip. Furthermore, this method is also not able to measure the delay occurring at individual intermediate nodes.

All of these disadvantages to current network performance monitoring methods arise generally from the fact that the intermediate nodes in the virtual connection relay the OAM cells but do not actually modify their payloads. Although ATM switches can have the capability to remove and manipulate the header of an ATM cell, it is not normal for a switch to process the entire payload of a cell. When this does occur, it is only done through removal of the cell from its place in the cell stream, which currently prevents such a cell from being used to calculate position dependent parameters such as cell delay and cell loss. For this reason, OAM cells used in performance monitoring are solely a mechanism for measurement of performance between the two endpoints of the virtual connection. The performance monitoring capability of the network is severely limited by this lack of ability of intermediate nodes to add information into the payload of a passing data packet. What has been needed is a way to collect and utilize the information that can be provided to the performance monitoring system by the intermediate nodes.

Objects of the Invention

Accordingly, a primary object of the present invention is to provide accurate, instantaneous monitoring of the performance of a packet-switched network connection.

In particular, an object of the present invention is to monitor and report the delay experienced at each intermediate node of a network connection by a packet traveling along the connection, as well as to calculate accurate end-to-end delay along the connection.

A further particular object of this invention is to accurately monitor and report the number of packets lost or discarded by each intermediate node in a network connection, as well as to accurately calculate the number of packets lost end-to-end.

SUMMARY

In one aspect of the invention, a new class of packet is defined which has a payload that is modified by each node along a virtual connection. Management packets are used to accurately measure and report the end-to-end QoS along a virtual connection, as well as to measure and report specific performance parameters at individual intermediate nodes. In an ATM embodiment, management cells are implemented by defining an entirely new type of cell or by defining additional fields within existing OAM cells. The switch at each intermediate node modifies the payload of management packets and locally measures delay and packet loss. A function type field specifies the particular performance monitoring function performed by each management packet. The information field of the management packet optionally contains timestamp fields, delay-stamp fields, and packet loss count fields.

In another aspect of the invention, intermediate switches can measure the difference between the arrival time and the departure time of any packet at that switch. For an end-to-end delay accumulating management packet, a delay-stamp field is incremented by the local delay measured at each switch. When the management packet reaches the endpoint of the virtual connection, the delay-stamp field indicates the cumulative amount of time that the packet has been delayed by the nodes of the network.

In another aspect of the invention, a node-by-node delay measurement management packet allows computation and relay of instantaneous delay information by utilizing multiple delay-stamp fields to record each delay encountered on a node-by-node basis. At the destination endpoint, the end-to-end delay is computed as the sum of the recorded delay-stamp fields. Alternatively, the switch may record in one timestamp field the time that the packet arrives, and then record the time the packet leaves into another timestamp field, with the calculation of node-by-node delay made when the packet reaches the endpoint of the virtual connection.

According to a further aspect of the invention, intermediate switches can count the number of packets each discards. When a node receives an end-to-end loss accumulating management packet, it increments a packet loss count field by the number of packets discarded by the node within that virtual connection since the previous loss management packet arrived. When the end-to-end loss accumulating management packet arrives at the virtual connection endpoint, the packet loss count field reflects the total number of discarded packets in the preceding block of user packets. Node-by-node loss measurement management packets contain multiple packet loss count fields for recording the number of discarded packets counted at each node since the departure of the previous loss management packet in that virtual connection. The total packet loss is then calculated at the endpoint of the virtual connection.

Associated management packets experience the same delay and packet loss rate as the user data packets in a particular virtual connection, implemented in one embodiment of the invention by having the management packets follow the same path as the user packets through the switch. The payloads of associated management packets are processed without the packet being removed from the data packet stream. In one embodiment, this is implemented by using the switch internal routing header. When the packets enter the switch input header processor, it uses the network routing instructions for each packet to create an internal routing header that, for a delay management packet, includes the time of entry into the switch. In an alternate embodiment, the time a delay management packet arrives at the switch is recorded directly into a timestamp field in the packet while the previous user data packet is being sent to the switch fabric.

In the former embodiment, all the data packets are routed through the switch fabric and directed towards their intended output ports through an output header processor, which removes the internal routing header from the packets, compares the time-of-day stamp in the internal routing header of delay management packets to the current time-of-day to calculate the delay incurred by each packet in the switch, and records the difference in the delay-stamp field of the management data packet. This occurs while the previous user data packet in the data stream is being sent to the output port so that the management data packet retains its place in the data stream. A similar procedure is followed if the timestamp field is used, with the output header processor reading the time of entry from that field.

In another aspect of the invention, packet loss counts are recorded in loss management packets. When a loss management packet is routed through the switch output header processor, the processor records into the packet loss count field the number of packets discarded by the switch within that particular virtual connection since the last loss management packet was processed. The packet loss count is recorded while the previous user data packet in the data stream is being sent to the output port, allowing the loss management data packet to retain its place in the data stream.

Non-associated management packets are extracted from the data stream and diverted to a special processor, therefore not retaining their positions relative to the user data packets in the same virtual connection. Non-associated management packets are used in one aspect of the invention by a control processor to report cumulative performance or usage measurements. The input header processor creates an internal routing header for non-associated management packets that directs the switch fabric to route the packets to the control processor for modification.

Non-associated management packets are used in another aspect of the invention to implement local measurement of packet delay and packet losses by replacing the non-associated management packet temporarily with a marker packet that holds the place of the non-associated management packet in the data stream while the control processor records the delay or packet loss count information in the payload of the management packet. The marker packet is then replaced in the data stream with the modified non-associated management packet. Local measurement of delay and packet loss is implemented in an alternate embodiment of the invention by routing all data packets through a control processor, recording delay and packet loss count information into appropriate management packets, and performing dummy writes to user data packets.

DETAILED DESCRIPTION OF THE PREFERRED EMBODIMENT

The limitations of prior art network connection performance monitoring methods are eliminated by defining a special class of packet, a "management packet," having a payload that can be modified by each node along a virtual connection. This method can be applied to any packet-switching network. In the preferred ATM embodiment, these "management cells" can optionally be implemented as extensions of current OAM cells. Like OAM cells, management cells carry measurement data along the virtual connection in the cell information field. The major difference between management cells and prior art OAM cells is that the information field of a management cell is modified by all the network nodes along a virtual connection, not just by the virtual connection endpoints. This new capability makes it possible for the performance monitoring system to track the performance of each node along the virtual connection, rather than just the end-to-end performance of the virtual connection as a whole.

Management packets are used to accurately measure the end-to-end QoS experienced by the user packets along any virtual connection. In addition, specific performance parameters measured at individual intermediate nodes are made available to the performance monitoring system. This allows in-service monitoring to be used to accurately identify the QoS actually seen by users and to detect exact causes of performance deterioration before users are seriously affected. The method of the present invention therefore offers vastly improved in-service monitoring of both end-to-end to-end packet delay and packet loss rate.

The method requires that the router or switch at each node have specific, unique capabilities, including local processing of management packets and local measurement of packet delay and packet loss. Management packets are used to accurately measure end-to-end packet delay, without the need for time-of-day clock synchronization between network connection endpoints, by measuring and reporting the packet delay at each node along a virtual connection. Likewise, management packets allow accurate measurement and reporting of both end-to-end packet loss and packet loss at each node along a virtual connection.

Figure 1:
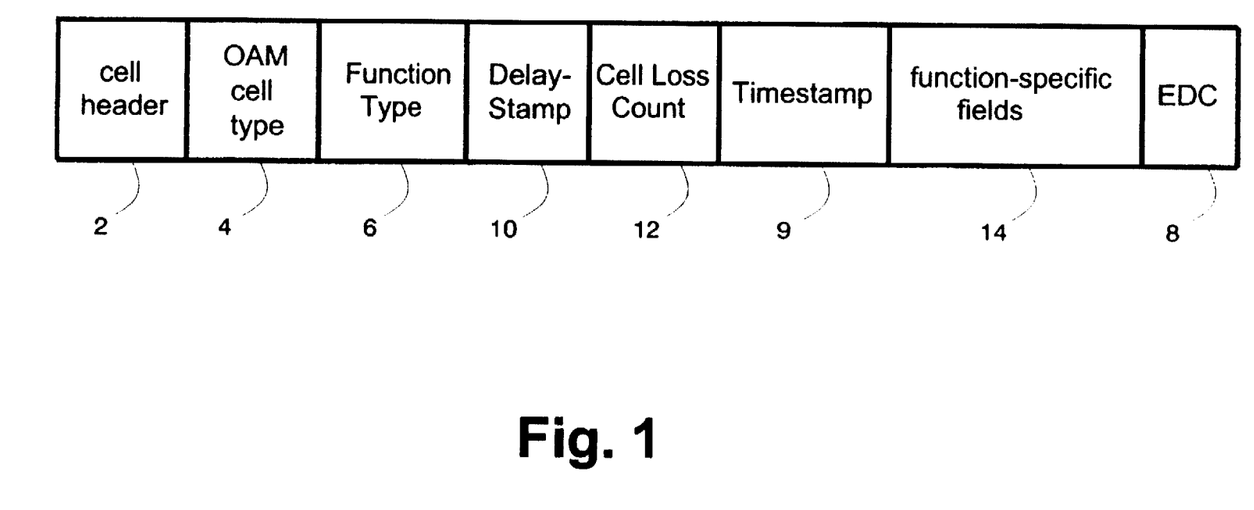
FIG. 1 is a block diagram of an embodiment of the management packet of the present invention for an ATM implementation.

The ATM management cells of the preferred embodiment may be implemented either by defining entirely new cells, or by defining additional fields within existing OAM cells, since existing OAM cells used for performance management have 33 bytes in the information field that are unused. An embodiment of a management cell for an ATM application is shown in FIG. 1. A 53-byte ATM management cell has a standard 5-byte ATM cell header 2. Within this cell header 2, the cell is identified to the network as an OAM cell by specific codes in the VCI and/or PT fields (VCI=3, VCI=4, PT=4 or PT=5). In an alternate embodiment, entirely new VCI and PT codes are defined that uniquely identify the cell to the network as an ATM management cell.

If existing OAM VCI and PT codes are used in the cell header 2, the management cell is instead uniquely identified as a management cell to the network by a special code in the 4-bit OAM Cell Type field 4. A 4-bit Function Type field 6 further indicates the specific performance monitoring function performed by the management cell. As in a regular OAM cell, a 10-bit EDC field 8 contains an error detection code that is computed over the information field of the cell.

In the ATM embodiment of FIG. 1, the Function Type field 6 contains a code that describes to the network the type of performance monitoring function performed by the ATM management cell, labeling the cell as an "end-to-end delay accumulating" cell, a "node-by-node delay measurement" cell, an "end-to-end loss accumulation" cell, a "node-by-node loss measurement" cell, or as some combination of the previous types. Additional codes can be defined for the monitoring of other performance parameters. The information field of the management cell will also optionally contain a 4-byte Timestamp field 9, a Delay-stamp field 10, and a Cell Loss Count field 12, as well as other function-specific fields 14 that are used for additional delay-stamps, cell loss counts, etc., as needed. These fields can also be used for monitoring and reporting other performance parameters.

For measurement of packet delay, a switch is required that can measure the difference between the arrival time and the departure time of any packet at that switch, a capability known as "local observability" of packet delay. Because most switches have at least some buffering capability, the delay incurred by a packet in the switch can be highly variable, particularly where a priority-based buffering scheme is implemented. Packet delay within a switch tends to increase as network traffic increases. Existing packet switches are not currently implemented so as to have the ability to measure the delay experienced by a packet within the switch itself. The management packet method utilizes measurements of the individual packet delay experienced between the input and output of each of the intermediate switches. Existing switches used with performance monitoring OAM cells have the ability to timestamp OAM cells when they enter a cell stream. In the management packet method, this activity can be replicated at each intermediate node. If the management packet is an end-to-end delay accumulating management cell, the intermediate node takes the Delay-stamp field 10, which was set to zero at the originating endpoint of the virtual connection, and increments it by the local delay measured at that switch, as illustrated in FIG. 2 for an ATM embodiment.

Figure 2:
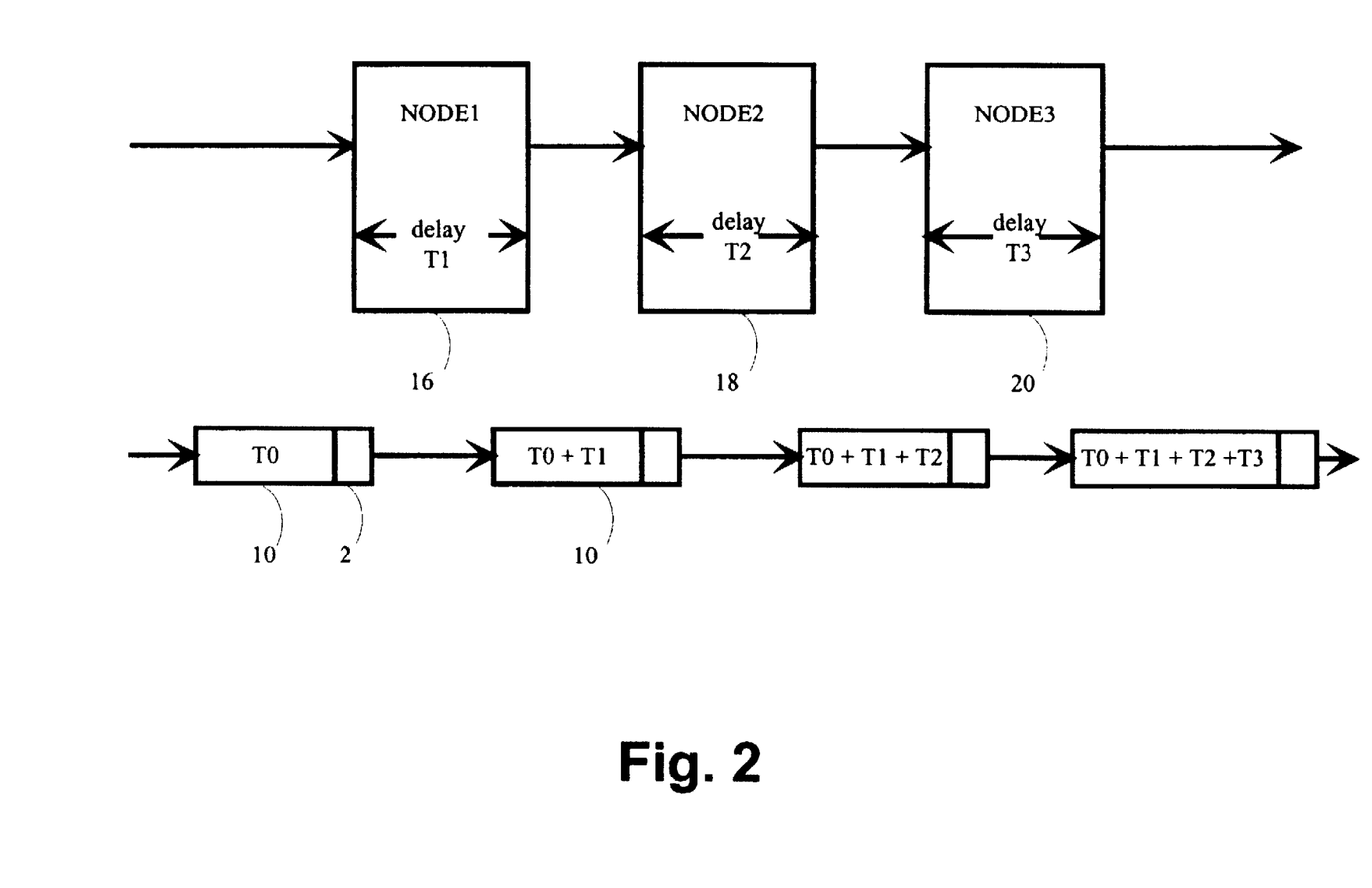
FIG. 2 is a block diagram illustrating one embodiment of the method of the present invention, utilizing end-to-end delay accumulating management cells.

In FIG. 2, the Delay-stamp field 10 initially contains a delay T0 from previous intermediate nodes. At node1 16, the time the cell of FIG. 1 enters the node 16 is recorded in the Timestamp field 9. This field is then compared to the time the cell leaves the node and the Delay-stamp field 10 is incremented by the difference, T1. At node2 18, a new time in is recorded in the Timestamp field 9, corresponding to the time the cell has entered the node 18. This field is again compared to the time the cell exits the node 18 and the difference, T2 is used to increment the value in the Delay-stamp field 10. A similar procedure is followed at node3 20, and so on, until the endpoint of the virtual connection is reached. Alternatively, the time a packet enters each node can be incorporated into a field in the internal routing header used by that node to direct the packet to the proper output, making use of a timestamp field within the packet unnecessary. The switch then examines the time of entry recorded in the routing header to calculate the delay that is written or incremented into the Delaystamp field.

Following either procedure, when the management cell of FIG. 2 finally reaches the endpoint of the virtual connection, the Delay-stamp field 10 indicates the cumulative amount of time that the cell has been variably delayed by the nodes of the network. If desired, this delay can then be added to the value of fixed propagation delay caused by the transmission links between the nodes in order to arrive at the total time that the cell has spent in the network. While this delay-stamp approach requires the new switch capability of local observability of packet delay, it has a big advantage over the OAM cell performance monitoring method in that it does not require any time-of-day synchronization between the switches in a network.

Figure 3:
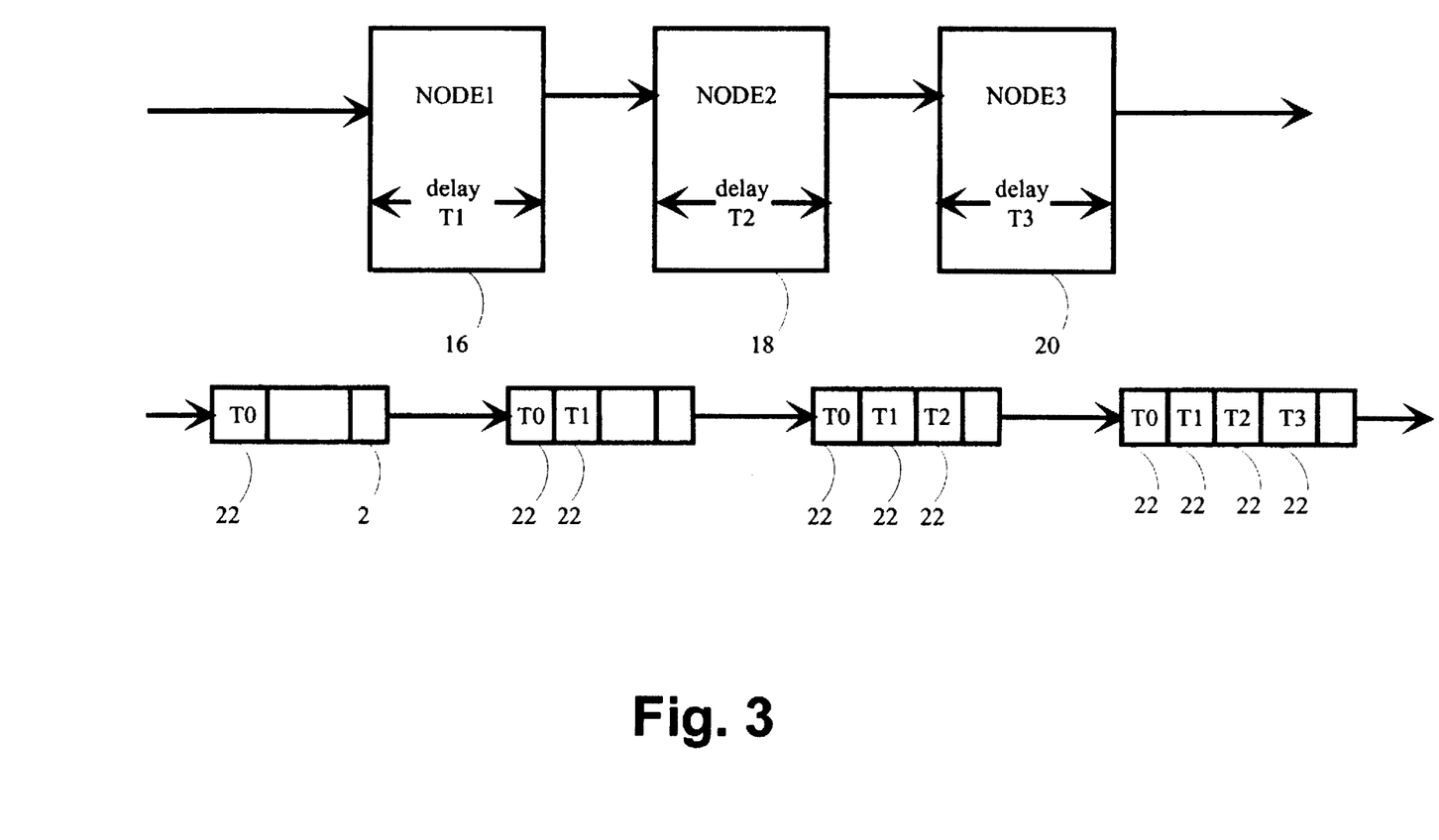
FIG. 3 is a block diagram illustrating another embodiment of the method of the present invention, utilizing node-by-node delay measurement management cells.

For monitoring of packet delay in more detail, a node-by-node delay measurement management packet may be used. A particular advantage of the nodeby-node delay measurement management packet is that it allows the computation and relay of instantaneous delay information. This type of management packet contains multiple delay-stamp fields for recording each local delay encountered on a node-bynode basis, as illustrated in FIG. 3 for an ATM embodiment. In FIG. 3, at each node the cell is stamped in the Timestamp field 9, or in the separate internal routing header, with the time of entry into the node. This time is then compared to the time of exit from that node and the calculated delay is recorded into the cell in one of a multiple of unused Delay-stamp fields 22. This allows monitoring of the delay performance of each intermediate node at the virtual connection endpoint. If desired, the end-to-end cell delay can also be computed at the destination endpoint, being the sum of the delay-stamp fields. Alternatively, additional timestamp fields can be used for each node, allowing the switch to merely record in one timestamp field the time that the packet arrives, and then record the time the packet leaves into another timestamp field. The calculation of node-by-node and end-to-end delay can then be made when the packet has reached the endpoint of the virtual connection. A further alternative is for the cell to be a combination delay cell, allowing the switch to record both the accumulated and the node-by-node delays in the same packet.

Measurement of packet loss requires a switch with local observability of packet loss, allowing the switch to count the number of packets it discards per virtual connection. Packet discards occur for various reasons, such as switch buffer overflow due to excessive traffic, corrupted routing information in a cell header field or on the virtual connection, and when packets have failed to arrive at their destination within a pre-specified time and have therefore "expired." Each switch must count the number of packets it discards within each virtual connection. This capability is already available in certain existing switches, such as the AT&T GlobeView-2000 switch [See AT&T, GlobeView-2000 Broadband System Network: Network Management, 255-179-079, Issue 1.0, Release 1.3, 1995] and the Newbridge 36150 MainStreet switch [See Newbridge, 36150 MainStreet ATMnet Access Switch Technical Practices, NNP 95-1602-01-00-A, Release 3.1, Generic A11113, 1995].

Figure 4:
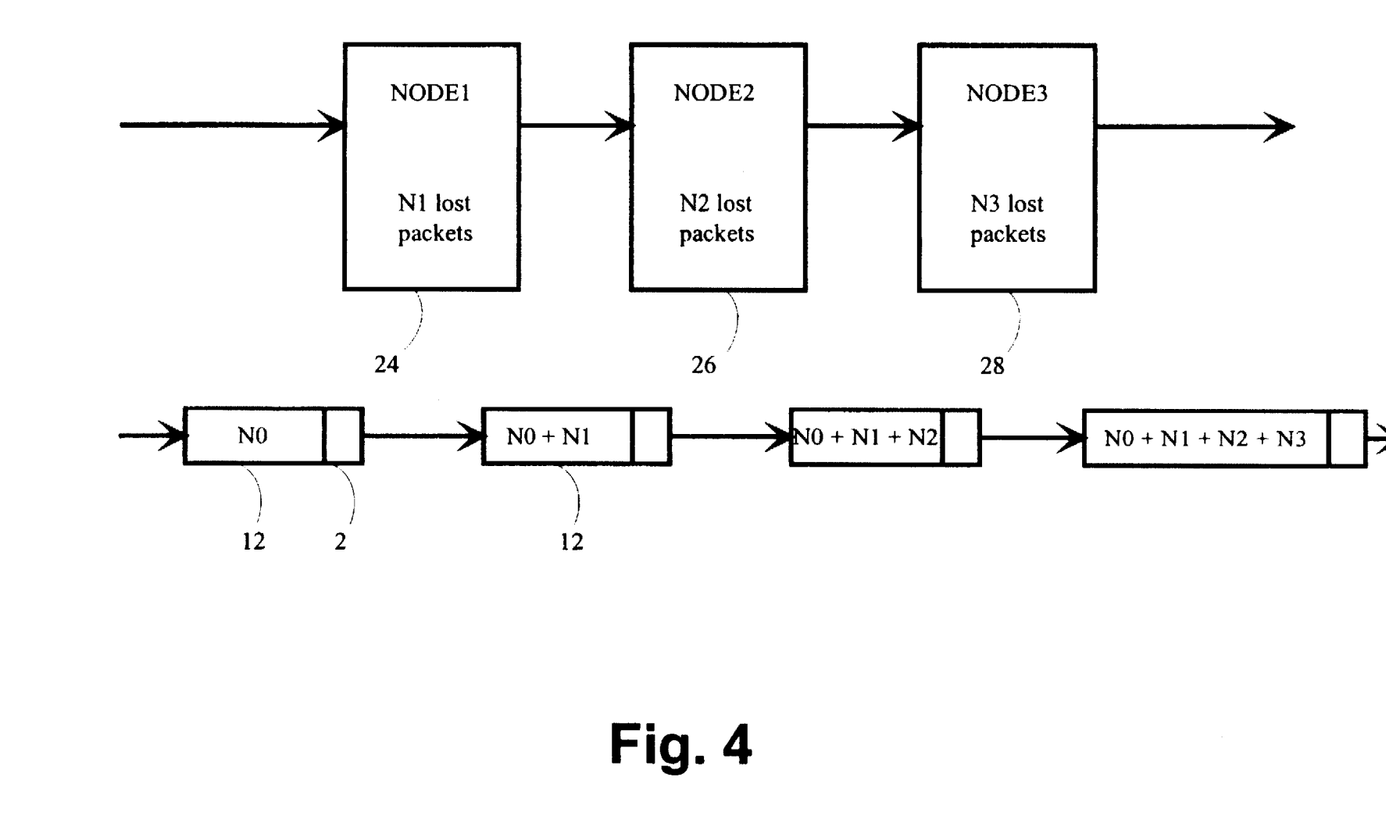
FIG. 4 is a block diagram illustrating an embodiment of the method of the present invention, utilizing end-to-end loss accumulating management cells.

The management packet used to measure packet loss can be the same packet as used to measure packet delay or a different packet. Packet loss is measured according to one embodiment of the present invention through the insertion of end-to-end loss accumulating management packets into a virtual connection between blocks of user packets, as illustrated in FIG. 4 for an ATM embodiment. Each end-to end loss accumulating management cell contains a Cell Loss Count field 12 that is initialized to zero. When node1 24 receives the end-to-end loss accumulating management cell with a Cell Loss Count field value N0, it increments the Cell Loss Count field 12 by the number of cells discarded by the node 24 in that virtual connection since the previous loss management cell arrived in that particular virtual connection. The cell is then received by node2 26, which increments the Cell Loss Count field 12 by the number of cells discarded within that virtual connection by that node. A similar procedure is followed at the next node, node3 28, and so on. By the time the end-to-end loss accumulating management cell ultimately arrives at its destination virtual connection endpoint, the Cell Loss Count field 12 accurately reflects the total number of discarded cells in the preceding block of user cells. In contrast to the use of existing OAM performance management cells, it is not required that a node know how many cells to expect in the user cell block, since each node accurately counts how many cells it discards.

Figure 5:
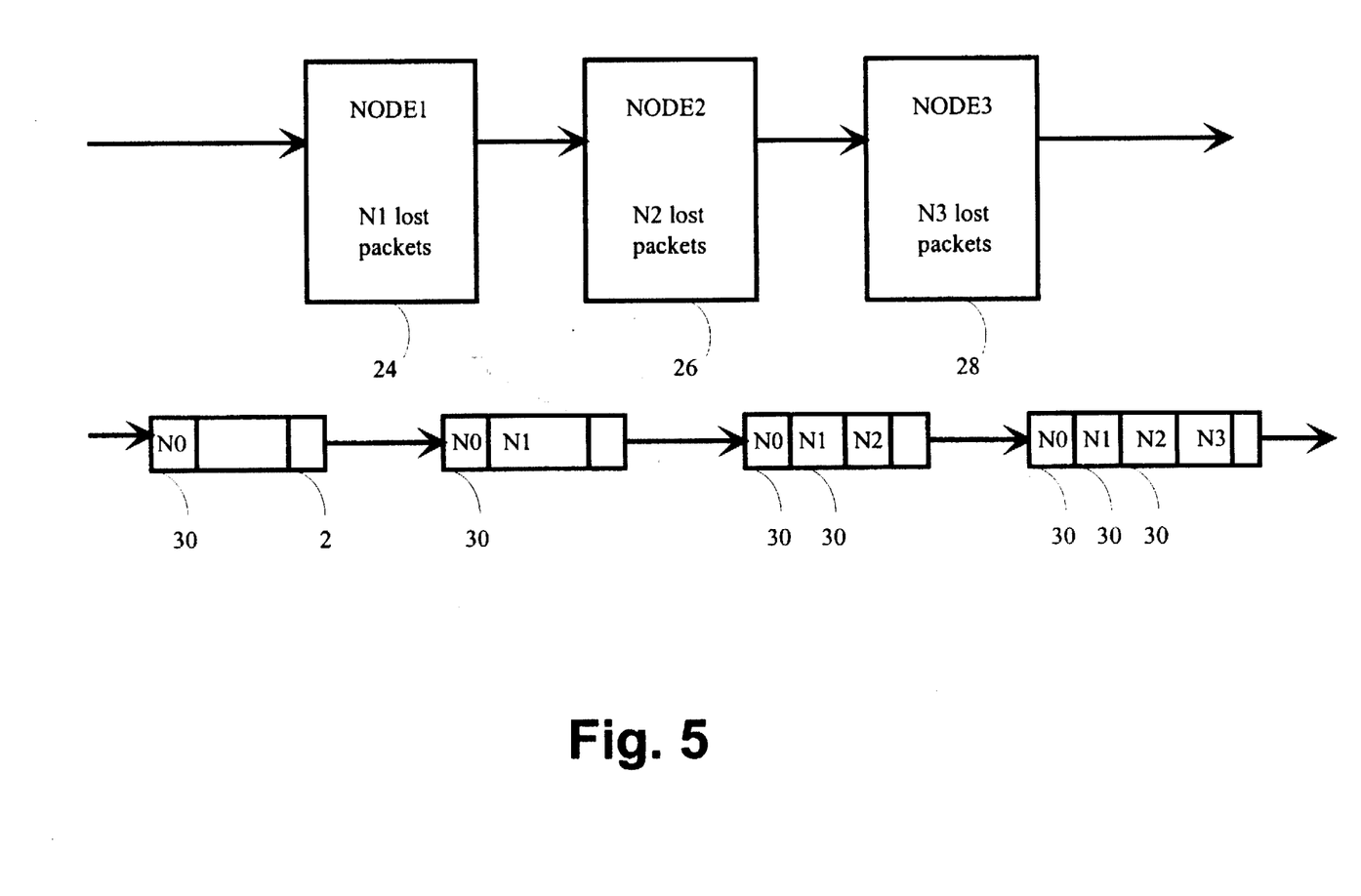
FIG. 5 is a block diagram illustrating another embodiment of the method of the present invention utilizing node-by-node loss measurement management cells.

For monitoring of packet loss in greater detail, node-by-node loss measurement management packets containing multiple fields to record the number of discarded packets counted at each node may be used. An illustration of this is shown in FIG. 5 for an ATM embodiment. At each node, the number of cells discarded within that virtual connection by that node since the departure of the previous loss management cell in that virtual connection is stamped at the nodes 24, 26, 28 into one of a multiple of unused Cell Loss Count fields 30. Just as for the node-by-node delay measurement management cell, the total cell loss is then calculated at the endpoint of the virtual connection. A combined loss management packet can be used to allow each node to record both accumulated and node-by-node packet loss simultaneously. Other useful information can be recorded in the node-by-node loss measurement management packet, such as the positions of individual discarded packets within a data packet block.

Figure 6:
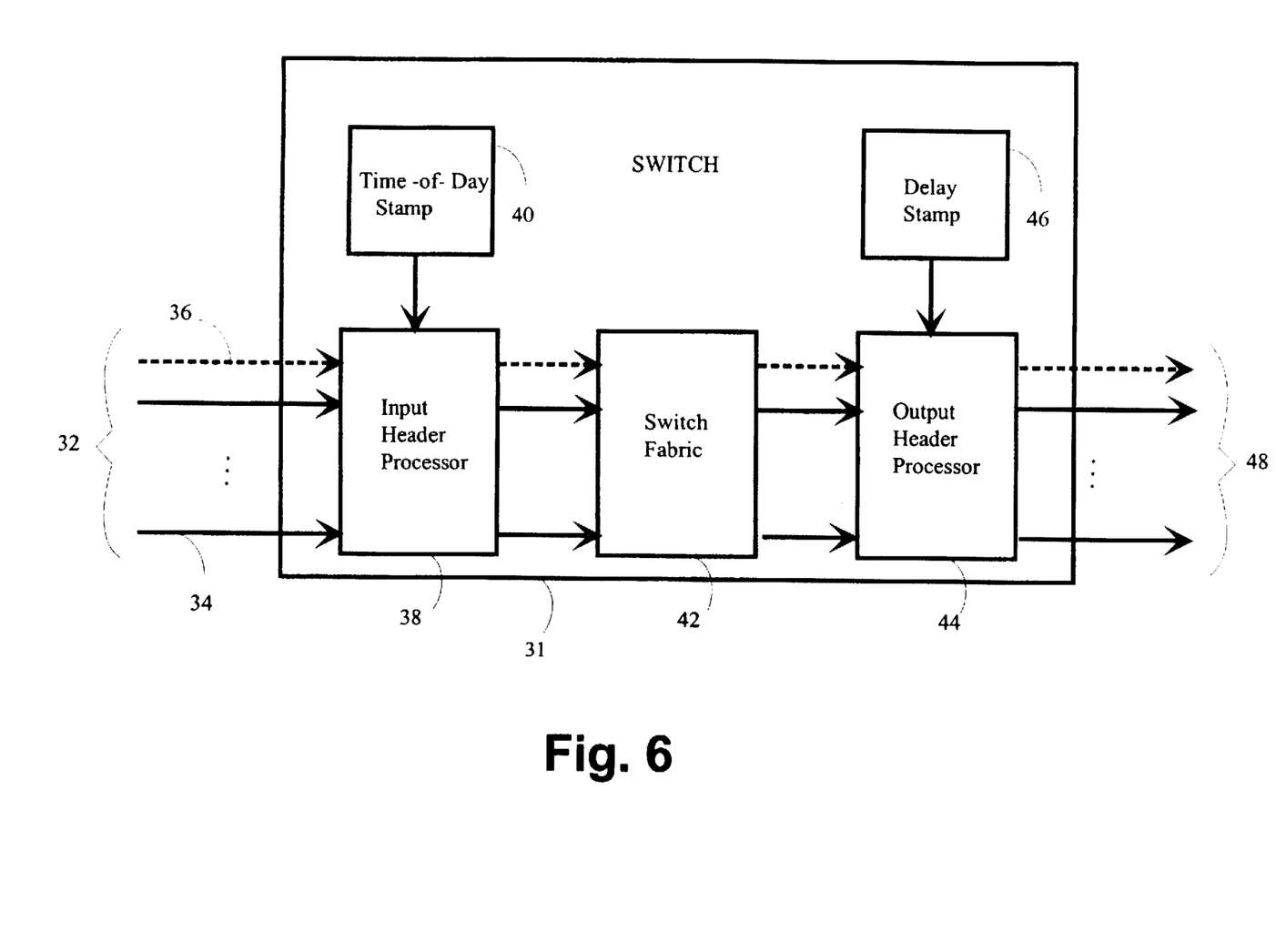
FIG. 6 is a block diagram illustrating the flow of associated management packets through a switch with local observability of packet delay according to one aspect of the present invention.

The methods described require in several of the embodiments that the management packets experience the same delay and packet loss rate as the user data packets in a particular virtual connection. The simplest way to implement this is to have the management packets follow the same path as the user packets through the switch. In order to accomplish this, the payloads of the management packets must be modified without removing the packets from the data packet stream. Management packets processed in this manner are "associated management packets". Shown in FIG. 6 is a block diagram of an embodiment of a switch with the capability of processing the payloads of associated management packets without removing them from the data packet stream. This embodiment also illustrates one of several possible implementations of local observability of packet delay.

In FIG. 6, a data stream enters the switch 31 at input ports 32. The data stream consists of user data packets 34 interspersed with management packets 36. The user packets 34 and management packets 36 enter the switch input header processor 38, which reads the network routing instructions for each packet and uses them to create an internal routing header that is then attached to that packet. If the packet is a delay management packet, creation of the internal routing header will include stamping of the time of entry into the internal routing header by the time-of-day processor 40. While it is only necessary to stamp delay management packets with the time of entry, if it is more expedient in terms of processor design, time, etc., it is not necessary that management packets 36 be distinguished from user data packets 34 by the input header processor 38. Instead, all incoming data packets on the input ports 32 can have a time of entry recorded in their internal routing header.

Once the internal routing header has been created, all the data packets are routed through the switch fabric 42 and directed towards their intended output ports 48. Before entering the output ports 48, the packets are routed through the output header processor 44, which removes the internal routing header from the packets. At this time, the processor 44 identifies the delay management packets 36 and uses the time-of-day stamp in the internal routing header to calculate the delay incurred by each packet in the switch. The time-of-day stamp in the internal routing header is compared to the current time-of-day, and the difference is written or incremented by the Delay-stamp processor 44 into the delay-stamp field of the management data packet 36, while the previous user data packet 34 in the data stream is being sent to the appropriate output port 48. In this way, the management data packet retains its place in the data stream. In an alternate embodiment, the delay-stamp processor 46 can merely record the time of exit directly into a timestamp field in the delay management packet 36, allowing the delay calculations to be made later when the packet has reached the virtual connection endpoint.

A similar procedure is used in a preferred embodiment to enter packet loss counts into loss management packets. It is not necessary that loss management packets be stamped with a time of entry to the switch by the time-of-day processor 40, but this may be done if it is more expedient to do so. When a loss management packet is routed through the output header processor 44, the processor identifies it as a loss management packet. The number of packets discarded by the switch for that particular virtual connection since the last loss management packet in that virtual connection was processed by the switch is then written or incremented into the packet loss count field of the packet. This writing can be done either as an additional function of the Delay-stamp processor 46, or by a separate processor operating in a similar manner. The packet loss count is written into the loss management data packet 36 while the previous user data packet 34 in the data stream is being sent to the appropriate output port 48, allowing the loss management data packet to retain its place in the data stream.

In an alternate embodiment, the time-of-day processor 40 writes the time a delay management packet 36 arrives at the switch directly into a timestamp field in the packet rather than into the internal routing header. In this case, the time-of-day processor 40 will function like the delay-stamp processor 46 in that the time of entry will be recorded in the payload of the delay management packet 36 while the previous user data packet 34 is being sent to the switch fabric 42. The delay-stamp processor 46 then reads the time of entry from the timestamp field of the delay management packet and uses it to calculate the delay by which the processor 46 increments the delay-stamp field in the packet.

A switch capable of modifying packets without removing them from their place in the data stream has uses beyond the performance monitoring function. For example, such a switch could be utilized to help recovery in the ATM Application Layer by allowing identification of from exactly where in the data stream a cell has been lost. This information in turn can be used to request a retransmittal of that cell only, consuming fewer resources than if an entire data block had to be retransmitted. Alternatively, the same information can be used to minimize the damage caused to the data by the absence of the cell, without retransmittal, via error concealment processes.

Figure 7:
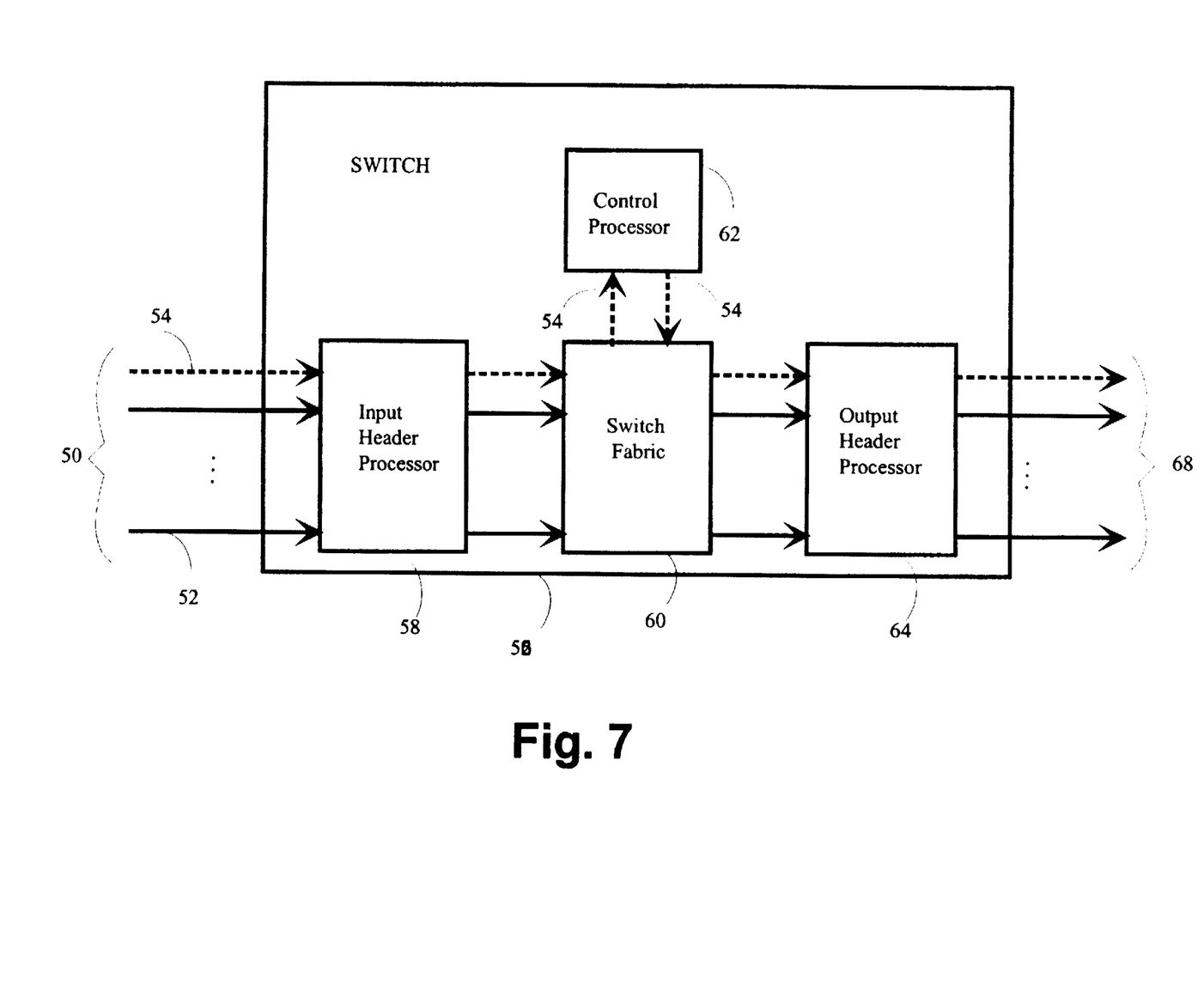
FIG. 7 is a block diagram illustrating the flow of non-associated management packets through a switch according to another aspect of the present invention.

If management packets must for some reason be extracted from the data stream and then diverted to a special processor, as shown in one embodiment in FIG. 7, they do not experience the same delay as user data packets and will not normally retain their positions relative to the user data packets in the same virtual connection. In FIG. 7, a data stream consisting of user data packets and "associated management packets" 52, interspersed with "non-associated management packets" 54, enters the switch 56 at input ports 50.

Associated management packets are those management packets that are intended to be processed in a manner that allows them to retain their place in the data stream, while non-associated management packets are management packets that are processed in such a way that they lose their position with respect to the other packets in the data stream. Non-associated management packets are used to gather cumulative information from each switch, such as the average and maximum packet delays measured in the switch since the previous management packet. The control processor 62 accumulates a set of such performance or usage measurements and records this information into the arriving non-associated management packets 54. The ability to write into the payload of a non-associated type of packet is available in existing switches, such as the GTE Government Systems SPANet switch.

In the embodiment of FIG. 7, the user data packets/ associated management packets 52 and some non-associated management packets 54 enter the switch input header processor 58, which reads the network routing instructions for each packet and uses them to create an internal routing header that is then attached to that packet. If the packet is a non-associated management packet 54, the internal routing header directs the switch fabric 60 to route the packet 54 to the control processor 62 for modification. Once the internal routing headers have been created by the input header processor 58, the data/associated management packets 52 are routed through the switch fabric 60 and directed through the output header processor 64 towards their intended output ports 68. This means that the non-associated management packet has lost its place in the data stream while it was being modified by the control processor 62.

It is possible to use non-associated management packets to implement performance monitoring functions such as local observability of packet delay and packet losses. This is implemented in one embodiment by having the control processor 62 replace the non-associated management packet 54 that is removed from the data stream for processing with a dummy "marker packet" that holds the place of the non-associated management packet 54 in the data stream. The control processor 62 then separately records the necessary performance monitoring information in the payload of the management packet 54. When it has finished, the control processor 62 replaces the dummy marker packet in the data stream with the appropriate nonassociated management packet 54.

Alternatively, local observability of such performance parameters as delay and packet loss can be implemented using an alternate version of the control processor. In this embodiment, all data packets are routed through the control processor rather than just non-associated management packets. Parameters such as delay and packet loss count information are recorded into the payloads of appropriate management packets, while dummy writes are made to the payloads of user data packets, leaving the user data unchanged. Although this embodiment potentially requires some unnecessary write operations, it maintains the order of all packets in the data stream, and may provide efficiencies in implementation or in other areas.

Use of management packets provides an improvement over current OAM performance monitoring methods because intermediate nodes along a connection can add their own local performance data into the payload of the packets. Management packets with delay stamping can be used to accurately measure and report both the end-to-end packet delay and the packet delay at each node along a connection, without the need for time-of-day clock synchronization between nodes. Management packets can also accurately measure and report the packet loss at each node along a connection, minimizing the confusion created by misinserted packets. Non-associated management packets allow collection and reporting of cumulative performance and usage information from each node along a connection. The combination of the management packets and switches described allow accurate and detailed QoS measurements along a network connection.

Modifications and substitutions by one of ordinary skill in the art are considered to be within the scope of the present invention, which is not to be limited except by the claims which follow.

What is claimed is:

1. A method for performance monitoring in an electronic communications network having at least one network connection, each of said network connections having a network connection originating endpoint, a network connection destination endpoint, and at least one network connection intermediate node, comprising, in combination, the steps of:

creating at least one management data packet, each of said management data packets comprising a header and a payload data field, each of said management data packets further comprising, in combination:

routing header means, said routing header means being part of said management data packet header;

packet function field, said packet function field being part of either said management data packet header or said management data packet payload data field; and at least one payload local performance monitoring field, said payload local performance monitoring field being part of said management data packet payload data field;

inserting at least one of said management data packets into a stream of user data packets at one of said network connection originating endpoints;

measuring at least one performance monitoring parameter at each of said network connection intermediate nodes;

for each of said management data packets, recording, at each of said network connection intermediate nodes while maintaining the position of said management data packet in the packet datastream, in one of said payload local performance monitoring fields in said management data packet, said performance monitoring parameter measured at said network connection intermediate node; and extracting the values in said payload local performance monitoring fields after said management data packet reaches said network connection destination endpoint.

2. The method of claim 1, further comprising the steps, in combination, of:

including in said payload local performance monitoring fields at least one payload delay-stamp field, initialized to a predetermined value;

detecting entry of each of said management data packets into any of said network connection intermediate nodes;

for each of said management data packets and said network connection intermediate nodes, recording the time of entry of said management data packet into said network connection intermediate node;

detecting the imminent exit of said management data packet from said network connection intermediate node;

comparing the time of said imminent exit of said management data packet to said recorded time of entry; and incrementing, at said network connection intermediate node while maintaining the position of said management data packet in the packet datastream, the value in one of said payload delay-stamp fields by the difference between said time of entry and said time of exit.

3. The method of claim 2, further including the step of adding the values in all said incremented ones of said payload delay-stamp fields of said management data packet, in order to get a total accumulated delay value, when said management data packet reaches said network connection destination endpoint.

4. The method of claim 1, wherein each of said management data packets further include a packet type field, identifying to said network connection intermediate nodes and said network connection destination endpoint that said data packet is a management data packet.

5. The method of claim 1, wherein said routing header means of each of said management data packets contains a field identifying to said network connection intermediate nodes and said network connection destination endpoint that said data packet is a management data packet.

6. The method of claim 2, further including the steps, in combination, of:

including in said payload local performance monitoring fields at least one payload timestamp field; and for each of said delay management packets, recording, at said network connection intermediate node while maintaining the position of said management data packet in the packet datastream, into one of said payload timestamp fields, the time of entry of said management packet into said network connection intermediate node.

7. The method of claim 6, further including the step of adding the values in all said incremented ones of said payload delay-stamp fields of said management packet, in order to get a total accumulated delay value, when said management packet reaches said network connection destination endpoint.

8. The method of claim 6, further including the step of recording, at said network connection intermediate node while maintaining the position of said management data packet in the packet datastream, said time of imminent exit in an unused one of said payload timestamp fields of said delay management packet.

9. The method of claim 8, further comprising the step of comparing each of said payload timestamp fields containing said times of entry of said delay management packet into each of said network connection intermediate nodes to the corresponding one of said payload timestamp fields containing said time of imminent exit from said network connection intermediate node in order to obtain a delay value for each of said network connection intermediate nodes.

10. The method of claim 2, wherein said time of entry of said management packet into said network connection intermediate node is recorded in an internal routing header created at said network connection intermediate node and attached to said management packet while in said network connection intermediate node.

11. The method of claim 10, further including the step of adding the values in all said incremented ones of said payload delay-stamp fields of said management packet, in order to get a total accumulated delay value, when said management packet reaches said network connection destination endpoint.

12. The method of claim 1, further comprising the steps, in combination, of:

including in said payload local performance monitoring fields at least one payload discarded packet count field, initialized to a predetermined value;

counting at each of said network connection intermediate nodes the number of said user data packets that are discarded by said network connection intermediate node between the departure of an immediately previous one of said management data packets and the departure of a current one of said management data packets; and incrementing, at said network connection intermediate node while maintaining the position of said management data packet in the packet datastream, the value in one of said payload discarded packet count fields of said current one of said management data packets by said discarded number of said user data packets.

13. The method of claim 12, further comprising the step of adding the values in all said incremented ones of said payload discarded packet count fields of said management data packet, in order to get a total accumulated discarded user packet value, when said management data packet reaches said network connection destination endpoint.

14. The method of claim 2, further comprising the steps, in combination, of:

including in said payload local performance monitoring fields at least one payload discarded packet count field, initialized to a predetermined value;

counting at each of said network connection intermediate nodes the number of said user data packets that are discarded by said network connection intermediate node between the departure of an immediately previous one of said management data packets and the departure of a current one of said management data packets; and incrementing, at said network connection intermediate node while maintaining the position of said management data packet in the packet datastream, the value in one of said payload discarded packet count fields of said current one of said management data packets by said discarded number of said user data packets.

15. The method of claim 14, further comprising the step of adding the values in all said incremented ones of said payload discarded packet count fields of said management data packet, in order to get a total accumulated discarded user packet value, when said management data packet reaches said network connection destination endpoint.

16. The method of claim 15, further comprising the step of adding the values in all said incremented ones of said payload delay-stamp fields of said management data packet, in order to get a total accumulated delay value, when said management data packet reaches said network connection destination endpoint.

17. A router for use in an electronic communications network comprising, in combination:

at least one input for receiving data packets from at least one network connection;

at least one output for relaying data packets to one of said network connections;

means for detection of entry of a management packet into said router, said management packet being comprised of at least a header field and a payload field;

means for associatively recording the time of entry of said management packet into said router, wherein said means for associatively recording said time of entry records said time of entry in a payload timestamp field in the payload field of said management packet;

means for detection of the imminent exit of said management packet from said router; and means for recording, at said router, a parameter into the payload field of said management packet that can be used to obtain the delay incurred by said management packet in said router.

18. The router of claim 17, further including means for recording, at said router, said time of imminent exit of said management packet from said router into the payload field of said management packet.

19. A performance-monitored switching mechanism for concurrently routing each of a plurality of data packets in a datastream, each of said data packets comprising a header and a payload, to a selected one of plural output data pathways in accordance with a destination address, said mechanism comprising, in combination:

a plurality of input ports for concurrently receiving said data packets;

a plurality of output data pathways;

switching means connected between said input ports and said output data pathways; and means for modifying said payload of one of said data packets without said modified data packet losing its position in said datastream of said data packets, wherein said means for modifying said payload of one of said data packets further comprises, in combination:

means for selecting one of said data packets in said datastream to be modified in said payload;

means for writing data to said payload of said selected data packet; and means for performing dummy writes to non-selected ones of said data packets in said datastream.

* * * * *